United States Patent
Sullivan et al.

(10) Patent No.: US 11,429,954 B2
(45) Date of Patent: *Aug. 30, 2022

(54) STORED-VALUE CARD MANAGEMENT METHOD AND SYSTEM

(71) Applicant: Blackhawk Network, Inc., Pleasanton, CA (US)

(72) Inventors: Thomas J. Sullivan, Poland, OH (US); J. Simmons Graves, Pittsburgh, PA (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,384

(22) Filed: Nov. 23, 2020

(65) Prior Publication Data

US 2021/0073789 A1    Mar. 11, 2021

Related U.S. Application Data

(63) Continuation of application No. 16/284,184, filed on Feb. 25, 2019, now Pat. No. 10,872,331, which is a
(Continued)

(51) Int. Cl.
*G06Q 20/34* (2012.01)
*G06Q 20/20* (2012.01)
*G06Q 20/28* (2012.01)
*G06Q 20/36* (2012.01)
(Continued)

(52) U.S. Cl.
CPC ........... *G06Q 20/342* (2013.01); *G06Q 20/20* (2013.01); *G06Q 20/28* (2013.01); *G06Q 20/343* (2013.01);
(Continued)

(58) Field of Classification Search
CPC ...... G06Q 20/20; G06Q 20/351; G06Q 20/40; G06Q 30/0226
See application file for complete search history.

(56) References Cited

U.S. PATENT DOCUMENTS 6,000,608 A    12/1999    Dorf
6,612,487 B2    9/2003    Tidball et al.
(Continued)

OTHER PUBLICATIONS

Filing Receipt and specification for provisional patent application entitled "Stored Value Card Management Systems," by Thomas J. Sullivan, filed Sep. 20, 2007 as U.S. Appl. No. 60/994,509, 9 pages.
(Continued)

*Primary Examiner* — Christle I Marshall
(74) *Attorney, Agent, or Firm* — Barnes & Thornburg LLP; Jerry C. Harris, Jr.

(57) ABSTRACT

A computerized system for activating, issuing and otherwise managing transactions and activities pertaining to stored-value cards over a communications network. A central information database is provided for storing stored-value cardholder and card purchaser information received directly from respective stored-value cardholders and card purchasers PCs through a universal central processor via respective communication gateways. The central processor is coupled for communication realtime to multiple unaffiliated stored-value card processing networks normally operated by respective hosts. Each network includes a stored-value card processor coupled to a stored-value card database and multiple respective merchant communication devices. The central processor is programmed for managing the activation and issuance of transactions and activities for the stored-value card through the respective unaffiliated networks. The universal central processor is programmed to issue the stored-value cards directly to the cardholder or card purchaser by download over respective communication gateways. The universal central processor is further programmed for reporting the card activations, issuances, transactions and activities to the cardholders and the merchants thereby providing a universal management system.

19 Claims, 2 Drawing Sheets

Related U.S. Application Data continuation of application No. 15/616,182, filed on Jun. 7, 2017, now Pat. No. 10,217,106, which is a continuation of application No. 14/627,764, filed on Feb. 20, 2015, now Pat. No. 9,691,063, which is a continuation of application No. 14/144,291, filed on Dec. 30, 2013, now Pat. No. 8,998,081, which is a continuation of application No. 13/833,920, filed on Mar. 15, 2013, now Pat. No. 8,622,291, which is a continuation of application No. 13/588,052, filed on Aug. 17, 2012, now abandoned, which is a continuation of application No. 12/284,194, filed on Sep. 19, 2008, now Pat. No. 8,245,910.

(60) Provisional application No. 60/994,509, filed on Sep. 20, 2007.

(51) Int. Cl.
*G06Q 30/02* (2012.01)
*G06Q 30/06* (2012.01)
*G06Q 20/40* (2012.01)

(52) U.S. Cl.
CPC ....... *G06Q 20/3433* (2013.01); *G06Q 20/351* (2013.01); *G06Q 20/363* (2013.01); *G06Q 20/40* (2013.01); *G06Q 20/4018* (2013.01); *G06Q 30/02* (2013.01); *G06Q 30/0226* (2013.01); *G06Q 30/06* (2013.01)

(56) References Cited

U.S. PATENT DOCUMENTS

| | | | |
|---|---|---|---|
| 6,886,742 B2 | 5/2005 | Stoutenburg et al. | |
| 7,054,842 B2 | 5/2006 | James et al. | |
| 7,083,084 B2 | 8/2006 | Graves et al. | |
| 7,318,049 B2 | 1/2008 | Iannacci | |
| 8,245,910 B2* | 8/2012 | Sullivan | G06Q 30/02 235/379 |
| 8,595,074 B2 | 11/2013 | Sharma et al. | |
| 8,622,291 B2 | 1/2014 | Sullivan et al. | |
| 8,998,081 B2 | 4/2015 | Sullivan et al. | |
| 9,691,063 B2 | 6/2017 | Sullivan et al. | |
| 10,217,106 B2 | 2/2019 | Sullivan et al. | |
| 10,872,331 B2* | 12/2020 | Sullivan | G06Q 20/363 |
| 2002/0062249 A1 | 5/2002 | Iannacci | |
| 2002/0091578 A1 | 7/2002 | Thomas | |
| 2004/0139318 A1 | 7/2004 | Fiala et al. | |
| 2004/0211830 A1* | 10/2004 | Algiene | G06Q 20/10 235/379 |
| 2005/0027655 A1 | 2/2005 | Sharma et al. | |
| 2005/0051619 A1 | 3/2005 | Graves et al. | |
| 2005/0108121 A1 | 5/2005 | Gravett et al. | |
| 2005/0108159 A1* | 5/2005 | Gravett | G06Q 40/02 705/40 |
| 2006/0163347 A1* | 7/2006 | Foss, Jr. | G07F 7/1008 235/380 |
| 2006/0213978 A1* | 9/2006 | Geller | G06Q 20/10 235/380 |
| 2006/0224454 A1 | 10/2006 | Kantor et al. | |
| 2012/0323779 A1 | 12/2012 | Sullivan et al. | |
| 2013/0208254 A1 | 8/2013 | Liu et al. | |
| 2021/0073789 A1* | 3/2021 | Sullivan | G06Q 30/0226 |

OTHER PUBLICATIONS

Office Action dated Sep. 28, 2012 in U.S. Appl. No. 13/588,052, filed Aug. 17, 2012, 7 pages.

* cited by examiner

STORED-VALUE CARD MANAGEMENT METHOD AND SYSTEM

CROSS-REFERENCE TO RELATED APPLICATIONS

This application is a continuation application of, and claims priority to, U.S. patent application Ser. No. 16/284,184 filed Feb. 25, 2019, which is a continuation application of, and claims priority to, U.S. patent application Ser. No. 15/616,182 filed on Jun. 7, 2017, which is a continuation application of, and claims priority to, U.S. patent application Ser. No. 14/627,764 filed on Feb. 20, 2015, now U.S. Pat. No. 9,691,063, which is a continuation application of U.S. patent application Ser. No. 14/144,291 filed on Dec. 30, 2013, now U.S. Pat. No. 8,998,081, which is a continuation application of U.S. patent application Ser. No. 13/833,920 filed on Mar. 15, 2013, now U.S. Pat. No. 8,622,291, which is a continuation application of U.S. patent application Ser. No. 13/588,052 filed Aug. 17, 2012, which is a continuation application of U.S. patent application Ser. No. 12/284,194, filed Sep. 19, 2008, now U.S. Pat. No. 8,245,910 which claims the benefit of U.S. Provisional Patent Application No. 60/994,509, filed Sep. 20, 2007, for STORED-VALUE CARD MANAGEMENT SYSTEM, the contents of which are incorporated herein by reference.

BACKGROUND

The present invention relates generally to stored-value cards used for purchasing goods and services, and more particularly to a computerized method and system for activating, issuing and otherwise managing transactions and activities pertaining to stored-value cards over a communications network.

Examples of stored-value cards are prepaid cards, gift cards, rewards cards and the like. Each stored-value card transaction and activity is managed through its respective card processing network. Each such network typically includes a stored-value card processor coupled to a stored-value card database and to multiple respective merchant communication interface devices, such as point-of-sale (POS) terminals or communication gateways, such as an Internet gateway. These respective stored-value card processing networks are unaffiliated and they are operated through different stored-value card processor systems operated by different respective hosts, such as Chase Paymentech™, RBS WorldPay™, Radiant/Aloha™, Future POS™, or any of a number of other stored-value card processor hosts.

There exists a large number of patent applications and patents pertaining to how these respective stored-value card processing networks should process activities and transactions. An example of one such network is disclosed in U.S. Pat. No. 7,083,084.

SUMMARY OF THE INVENTION

It is a principal object of the present invention to provide a universal method and system for managing these multiple unaffiliated stored-value card processing networks.

The present invention provides a method and apparatus for managing stored-value cards, such as gift, prepaid and rewards card activity for multiple locations or unaffiliated group entities or networks. Most of these transactions and activities are accomplished through realtime data communications with these different unaffiliated stored-value card processors through a universal central processor, which enables unlike make and model credit card terminals and point-of-sale systems to be consolidated into a universal reporting system for stored-value cardholder transactions and activities.

The method and system of the present invention activates, issues and otherwise manages transactions and activities pertaining to multiple or many unaffiliated stored-value card processing networks. As previously explained, each such existing stored-value card processing network generally includes a stored-value card processor connected to a stored-value card database and multiple respective merchant communication interface devices, such as POS terminals, computers or other communication gateways, for communication by the respective merchants with the processors.

The present invention provides universal management of these unaffiliated systems by providing a universal central processor that communicates with a universal stored-value card cardholder information database which is managed by this universal central processor. This universal central processor also communicates with potential or existing stored-value cardholders or holder benefactors (card purchasers), and further communicates in realtime (with the exception of reporting transactions and activities in some instances) with the multiple respective unaffiliated stored-value processing networks. Accordingly, all activation and issuance of and selected transactions and activities for the stored-value cards are managed by the universal central processor through the unaffiliated networks.

The universal central processor is programmed for activating and issuing stored-value cards through the unaffiliated stored-value card processors, which are owned by different hosts, directly to the cardholders or holder benefactors PC via a communication gateway. Upon activation of a stored-value card through the universal central processor, the universal central processor issues an authorization number for each respective card and issues the stored-value card directly to the cardholder or card purchaser through a communication gateway or an Internet gateway, the card being downloaded and printed by the cardholder or card purchaser on a PC. The universal central processor is further programmed for managing stored-value card transactions and activities through the different unaffiliated stored-value card processors and then reports the activations, transactions and activities to the respective merchants and cardholders. Thus a universal system is provided for management of stored-value card activation, issuance and management of transactions and activities for unaffiliated host networks, all over a communications network.

The method and system of the present invention permits immediate electronic sale and issuance of a stored-value card based authorization number from a central universal processing system, the redemption of which is done through credit card terminals, point-of-sale systems or gateways which are used for secure control of funds availability.

Thus, no matter what unaffiliated stored-value card is being issued, the issuance thereof can be universally accomplished over a communication gateway connection by the universal central processor directly to the cardholder or the card purchaser. The universal central processor links all stored-value card transactions and activities accomplished through one of the unaffiliated networks directly to an individual cardholder identified in the central cardholder information database and all such card activations, issuances, transactions and activities are reported by the universal central processor to the cardholders and the merchants.

BRIEF DESCRIPTION OF THE DRAWINGS

Other objects and advantages appear hereinafter in the following description and claims. The accompanying drawings show, for the purpose of exemplification, without limiting the scope of the present invention or the appended claims, certain practical embodiments of the present invention wherein:

DETAILED DESCRIPTION

Figure 1:
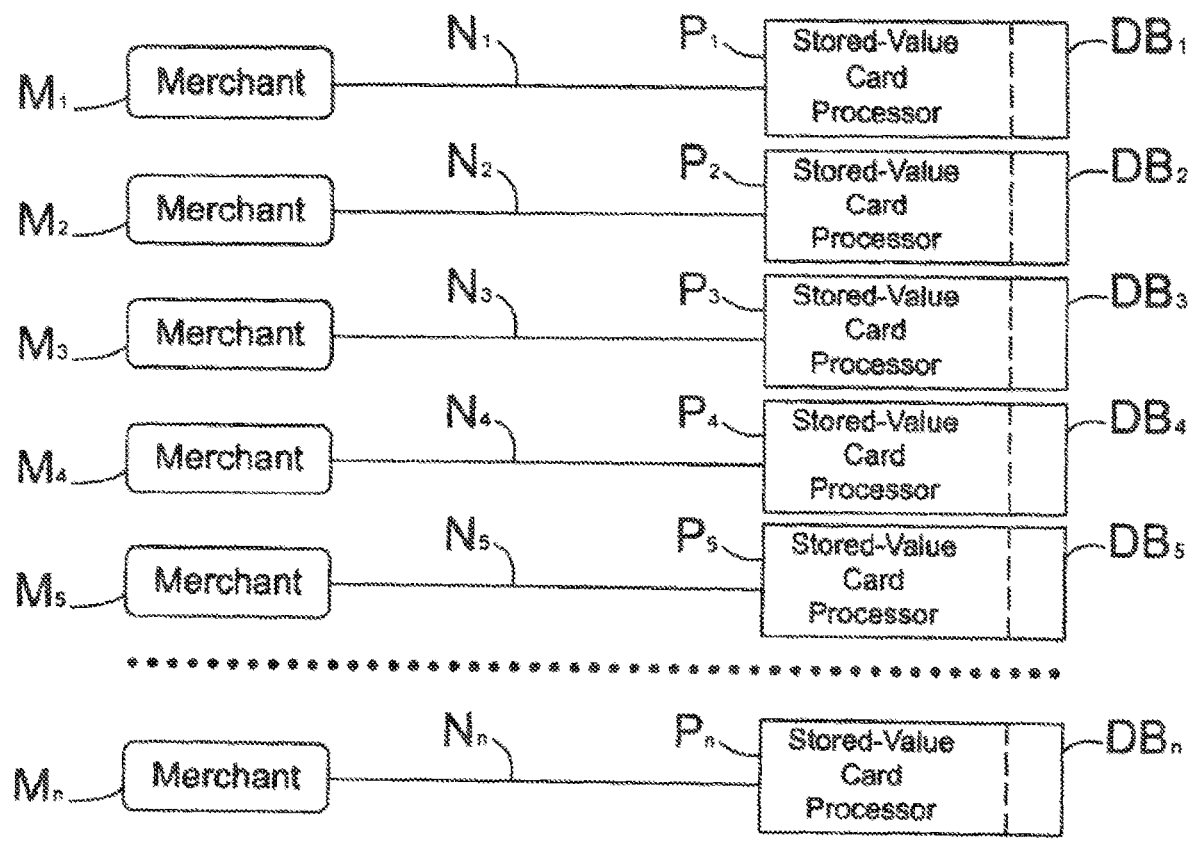
FIG. 1 is a schematic block diagram illustrating how existing unaffiliated stored-value card processing networks function or operate.

Multiple unaffiliated stored-value card processing networks are utilized as illustrated in FIG. 1 for the management of stored-value card transactions and activities for respective different stored-value card hosts. These separate and unaffiliated networks N1 through Nn are independently operated and managed by respective host stored-value card processors P1 through Pn, each stored-value card processors P1 through Pn being connected to a respective stored-value card database DB1 through DBn. The respective merchants communicate through communication interface devices M1 through Mn with the respective processors P1 through Pn for respectively handling stored-value card transactions and activities.

The merchant communication interface devices M1 through Mn might consist typically of, for example, a point-of-sale (POS) system or terminal or a more sophisticated communication system, such as a communication gateway, via PCs and handheld computers. A significant number of patents and patent applications exist regarding to how these networks N1 through Nn process the card activities and transactions and each respective network N1 through Nn is independently operated by a different unaffiliated host. For example, processors P1 through Pn are operated and maintained by different hosts, such as Future POS™, Radiant/Aloha™, Chase Paymentech™ and RBS WorldPay™.

The respective stored-value cards are normally issued to the cardholder by the respective merchant. Typical stored-value cards are gift cards, rewards cards, rebate cards, and other prepaid cards, such as for gasoline, telephone use etc.

These independent unaffiliated networks N1 through Nn, being independently operated, actually results in limited capability for all parties concerned, including the cardholder, the card benefactor or purchaser, the merchant and the host bank.

The stored-value card management system of the present invention provides universal management of gift, prepaid, and rewards card activity for all of these multiple location or unaffiliated group entities or networks N1 through Nn. Under the method and system of the present invention, realtime data communications of a universal central processor with the stored-value card networks N1 through Nn, unlike make and model credit card terminals and point-of-sale systems, provides consolidation into a universal reporting system of cardholder activity. The system also permits immediate electronic sale and issuance of a stored-value card-based authorization number and a corresponding card from a universal central processing system. The redemption of the cards is done through a credit card terminal, point-of-sale system, or other devices, such as a telephone or computer, capable of serving as a communication interface with the universal central processing system, or a gateway to the central processing system.

The method and system of the present invention thus permits the gift card or other stored-value cards, to be downloaded on a PC by the purchaser with immediate electronic sale and issuance of a stored-value card authorization number from a central universal processing system. The redemption of the issued cards is done through a credit card terminal, a point-of-sale system or gateway which is used for secure control of funds availability.

Figure 2:
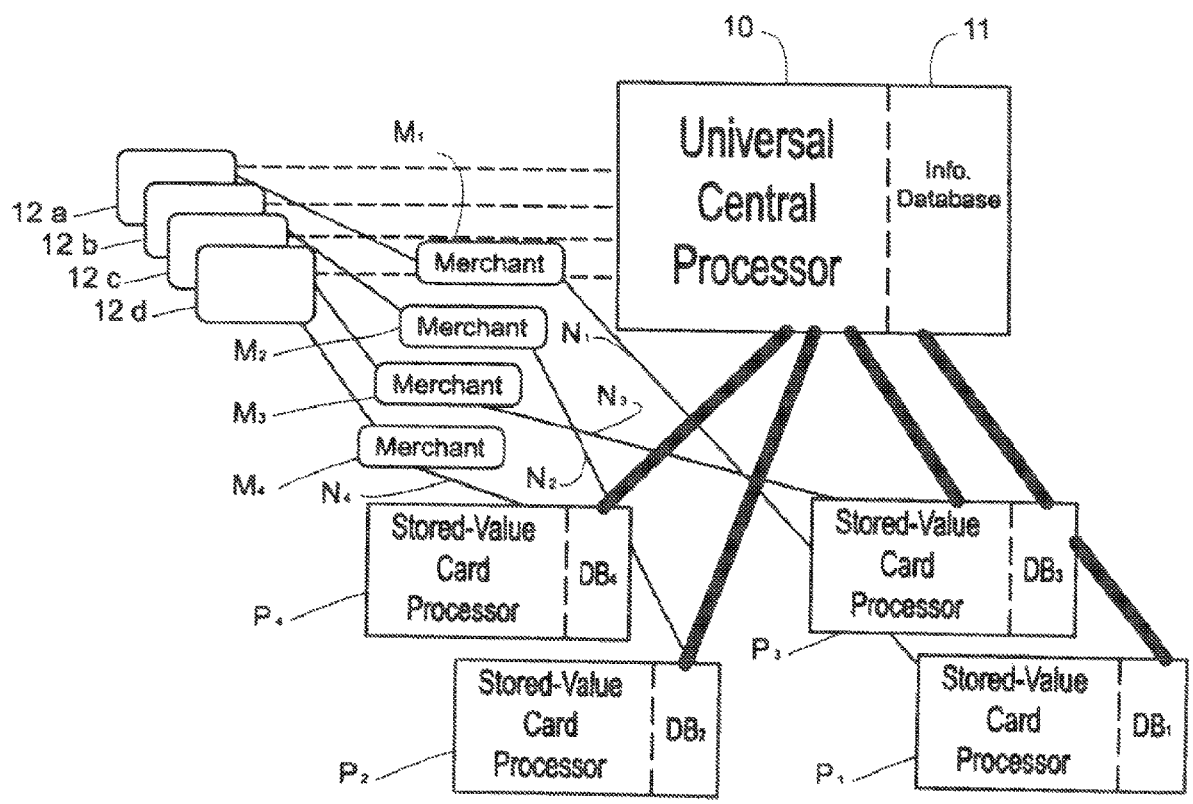
FIG. 2 is a schematic block diagram illustrating the computerized method and system of the present invention for universally managing the multiple unaffiliated stored-value card processing networks illustrated in FIG. 1.

Referring to FIG. 2, a universal central processor 10 is provided which overlooks and oversees the management of the many different unaffiliated networks N1 through Nn. Networks N1 through N4 only are illustrated for the sake of clarity and simplicity. The universal central processor 10 is connected to or communicates realtime with a universal stored-value cardholder information database 11 managed by the universal central processor 10. The universal central processor 10 in turn communicates realtime (except for some activity reporting purposes) with potential or existing stored-value cardholders or holder benefactors or purchasers via the communication or Internet gateways (PCs) 12a through 12d.

Universal central processor 10 is programmed for activating and issuing stored-value cards through the unaffiliated stored-value card processors P1 through P4 directly to the 12a cardholders or cardholder benefactors or purchasers via the communication gateways 12a through 12d. Universal central processor 10 is further programmed for managing the stored-value card transactions and activities through the stored-value card processors P1 through P4 and for reporting the activations, transactions and activities to respective merchants and cardholders through gateways M1 through M4 and 12a through 12d. Accordingly, the universal central processor associates all such transactions and activities directly with an individual cardholder identified in the information database 11. Such transactions include transactions, such as purchases, rewards, redemptions and placement of funds, and such activities include information for the cardholder and the merchant pertaining to balances and placement of funds, which activities are not always reported realtime.

The potential cardholder or card purchaser can log into the universal central processor 10 via a communication gateway 12a through 12d and register their card by entering some personal information, such as name, telephone number, address, e-mail address etc. Once registered in the information database 11 of the universal central processor 10, with payment being made and accepted through a credit card, an identification number is issued by the universal central processor 10 and the cardholder or cardholder benefactor can download the stored-value card on his or her respective gateway communication device 12a through 12d. Once the card has been issued, the cardholder may request a card balance, add funds to the stored-value card via a credit card or request other related information from the universal central processor, and the respective merchants and host processors are notified by the universal central processor 10 of the activation and issuance of the card via their respective communication gateways M1 through M4 and processors P1 through P4. The merchants through their respective communication gateways M1 through M4 can interact with the respective stored-value processors P1 through P4 through the universal central processor 10. The merchant can also add bonus funds to a card for purchases made.

Accordingly, the system of the present invention can produce a merchant-specific gift card on the Internet that can be printed by the customer or e-mailed to the gift recipient. Because the card is, in a sense, created by the purchaser, any amount can be placed on the card. In addition, the purchaser can choose a holiday occasion for the gift card and can add a personal message that is incorporated on or in the card.

Security for the issued card resides in the fact that it is a stored-value card and only the funds or partial funds left on the card can be redeemed. The recipient's name and Card Verification Valued number may also be placed on the card for future merchant security.

In addition, the system of the present invention can be employed in a wide variety of marketing programs. Newsletters, new product announcements, and seasonal specials can all be sent to customers through a mass e-mail system operated by the universal central processor 10. Other customer alerts, such as the creation of gift card rewards can also travel to the customer via this e-mail system. The system also may be provided with built-in tracking functions to help in marketing analysis.

The system and method of the present invention permit increase in profit for the merchant by providing a 24 hour a day, 7 day a week sales location over the Internet. Extreme conveniences are provided by being able to obtain a gift card or other stored-value card by immediate download which is ready for immediate use.

We claim:

1. A system for universal management of multiple unaffiliated stored-value card processing networks, each network including a stored-value card processor connected to a stored-value card database, and multiple respective merchant communication interface devices for communication by respective merchants with said processors, said universal management system comprising:
   a universal central processor communicating with a universal value-card cardholder information database managed by said universal central processor, with potential or existing stored-value cardholders or holder benefactors, and with said stored-value card processing networks, said universal central processor programmed for activating and issuing stored-value cards through said unaffiliated stored-value card processors directly to said cardholders or holder benefactors via communication gateways, and managing the stored-value card transactions and activities through said stored-value card processors with universal reporting to respective merchants and cardholders.

2. The system of claim 1, wherein said universal central processor is further programmed to link each of said transactions and activities with a cardholder in said universal value-card cardholder information.

3. The system of claim 1, said stored-value cards including gift cards, prepaid cards and reward cards.

4. The system of claim 1, wherein said merchant communication interface devices include a point-of-sale (POS) terminal or a communication gateway.

5. The system of claim 4, wherein card activation and merchant card transactions are communicated via said merchant communication interface devices.

6. The system of claim 1, wherein said managing the stored-value card transactions includes storing individual cardholder information in the universal value-card cardholder information database and directly associating each stored-value card transaction and activity accomplished in the universal value-card cardholder information database.

7. The system of claim 1, wherein said managing the stored-value card transactions includes reporting card activations, issuances, transactions or activities by the universal central processor to the respective merchants, cardholders, or both.

8. The system of claim 1, wherein communicating with the universal value-card cardholder information database managed by said universal central processor, with the potential or existing stored-value cardholders or holder benefactors, and with said stored-value card processing networks, or combinations thereof, occurs in real-time.

9. The system of claim 8, wherein communicating with the universal value-card cardholder information database managed by said universal central processor, with the potential or existing stored-value cardholders or holder benefactors, and with said stored-value card processing networks, or combinations thereof, comprises issuing an authorization number by said central processor related to a card purchase.

10. A method of universally managing multiple unaffiliated stored-value card processing networks, each network including a stored-value card processor connected to a stored-value card database, and multiple respective merchant communication interface devices for communication by respective merchants with said processors, said method comprising:
   providing a universal central processor and communicating by said processor with a universal stored-value card cardholder information database managed by said universal central processor;
   communicating by said universal central processor with potential or existing stored-value cardholders or holder benefactors through communication gateways,
   communicating by said universal central processor with said stored-value card processing networks;
   programming said universal central processor for communicating with said unaffiliated stored-value card processors for electronically activating and issuing stored-value cards to said cardholders or holder benefactors through the central processor, and
   further programming said universal central processor for managing stored-value card transactions through said stored-value card processors.

11. The method of claim 10, further programming said central processor for associating each of said transactions directly with an individual cardholder identified in said information database.

12. The method of claim 10, further programming said central processor for sending bonus funds to a card for purchases made.

13. The method of claim 10, further programming said central processor for electronically sending offers and advertisements to cardholders.

14. The method of claim 10, further programming said central processor for creating gift card rewards and electronically sending such rewards to cardholders.

15. A computerized system for electronically providing stored-value cards over a communications network, the system comprising:
   a central information database for storing stored-value cardholder information;
   a central processor for receiving card purchasing requests from respective stored-value card holders or card purchasers, said central processor coupled for communication to multiple unaffiliated stored-value card processing networks, each network including a stored-value card processor coupled to a stored value card database and multiple respective merchant communication devices, said central processor programmed in response to a card purchaser request for communicating with a respective processor to electronically activate and issue a stored-value card through the central processor, and said central processor programmed for managing transactions originated by the cardholder or card processor for the stored-value cards through said unaffiliated networks.

16. The computerized system of claim 15, wherein said central processor is programmed to associate each stored-value card transaction accomplished through one of said networks with an individual cardholder identified in said central information database.

17. The computerized system of claim 15, wherein said central processor is programmed for reporting the card activations, issuances, transactions and activities to the cardholders and the merchants.

18. The computerized system of claim 15, wherein said central processor is programmed to issue an authorization number in response to receiving a card purchasing request.

19. The computerized system of claim 15, wherein said merchant communication interface devices include a point-of-sale (POS) terminal or a communication gateway.

* * * * *